US012431276B2

(12) United States Patent
Suzuki et al.

(10) Patent No.: US 12,431,276 B2
(45) Date of Patent: Sep. 30, 2025

(54) REACTOR

(71) Applicant: TAMURA CORPORATION, Tokyo (JP)

(72) Inventors: Kotaro Suzuki, Kumagaya (JP); Kosuke Shibasaki, Saitama (JP)

(73) Assignee: TAMURA CORPORATION (JP)

( * ) Notice: Subject to any disclaimer, the term of this patent is extended or adjusted under 35 U.S.C. 154(b) by 767 days.

(21) Appl. No.: 17/685,267

(22) Filed: Mar. 2, 2022

(65) Prior Publication Data

US 2022/0285076 A1 Sep. 8, 2022

(30) Foreign Application Priority Data

Mar. 4, 2021 (JP) ................................ 2021-034177
Dec. 24, 2021 (JP) ................................ 2021-210324

(51) Int. Cl.
*H01F 27/28* (2006.01)
*H01F 27/26* (2006.01)

(52) U.S. Cl.
CPC ....... *H01F 27/263* (2013.01); *H01F 27/2876* (2013.01)

(58) Field of Classification Search
CPC ...... H01F 27/263; H01F 27/2876; H01F 3/14; H01F 27/22; H01F 27/327; H01F 27/33; H01F 37/00; H01F 27/28; H01F 27/24
USPC ................ 336/83, 90, 92, 96, 196, 198, 212
See application file for complete search history.

(56) References Cited

U.S. PATENT DOCUMENTS

2004/0196128 A1 10/2004 DuVal
2018/0286580 A1 10/2018 Tanahashi
2019/0259532 A1* 8/2019 Hirabayashi ........ H01F 27/2823
2021/0027930 A1 1/2021 Chiba et al.
2021/0366646 A1 11/2021 Chiba et al.

FOREIGN PATENT DOCUMENTS

JP 57-031827 U 7/1980
JP 59-111022 U 7/1984
JP 2010-165800 A 7/2010
JP 2012-0285722 2/2012
JP 2013-149841 8/2013
JP 2013-222813 A 10/2013
JP 2014-063782 A 4/2014
JP 2017-041497 A 2/2017
(Continued)

OTHER PUBLICATIONS

Japanese Notice of Reasons for Refusal dated Jan. 7, 2025 of corresponding Japanese Application No. 2021-034177; 14 pages.

*Primary Examiner* — Tuyen T Nguyen
(74) *Attorney, Agent, or Firm* — Snell & Wilmer LLP

(57) ABSTRACT

A reactor that suppresses the transmission of the vibration of the core and the vibration of the coil and that reduces the vibration thereof is provided. The reactor includes a coil 3 with a cylindrical shape and a core 1 having legs 12 around which the coil 3 is wound. The core includes a core mold resin 2 which covers at least a part of the core 1, and a core holder which holds the core 1. The coil 3 includes a coil mold resin 4 which covers at least a part of the coil 3, and a coil holder which holds the coil 3. The core holder and the coil holder independently hold the core 1 and the coil 3, respectively, and a gap S1 is provided between the legs 12 and the inner circumferential surface of the coil 3.

6 Claims, 13 Drawing Sheets

(56) References Cited

FOREIGN PATENT DOCUMENTS

| | | | | | |
|---|---|---|---|---|---|
| JP | 2017-098420 | A | 6/2017 | | |
| JP | 2018-166189 | A | 10/2018 | | |
| JP | 2019-102632 | A | 6/2019 | | |
| JP | 2019-176094 | A | 10/2019 | | |
| JP | 2019-176095 | A | 10/2019 | | |
| WO | WO-2018159255 | A1 * | 9/2018 | ............. | H01F 27/24 |

* cited by examiner

REACTOR

CROSS-REFERENCE TO RELATED APPLICATION

This application is based upon and claims the benefit of priority from Japan Patent Application No. 2021-034177, filed on Mar. 4, 2021, and Japan Patent Application No. 2021-210324, filed on Dec. 24, 2021, the entire contents of which are incorporated herein by reference.

FIELD OF INVENTION

The present disclosure relates to a reactor including a core and a coil.

BACKGROUND

Reactors are used in various application such as OA equipment, solar power generation system, vehicles, and uninterruptible power supplies. The reactor is mainly formed of coils, cores, and resin components. The coil generates magnetic flux in accordance with a number of turns when power flows therethrough, and the core becomes a magnetic path through which the magnetic flux generated by the coil passes through. The reactor is an electromagnetic component which converts electric energy to magnetic energy, and accumulates and releases said energy. The resin component insulates the coil and the core.

As the reactors, for example, a double molded reactor is known, in which a first molding is performed to integrate the core and the resin component, the integrated core is assembled to the coil, and then a second molding is performed to integrate the core and the coil by the resin component. Alternatively, there is a method to integrate the core and the coil by molding the core and the coil separately and press-fitting the core integrated with the resin component to an inner circumference of the coil.

SUMMARY OF INVENTION

Problems to be Solved by Invention

The coil vibrates due to magnetic attraction, and the core vibrates due to magnetostriction. Accordingly, the reactor vibrates. Since the core and the coil are connected via the resin component when integrated, the vibration of the core and the coil is transmitted to each other. As a result, the vibration of the core and the coil resonates, such that the vibration of the reactor is increased. In recent years, further reduction of the vibration is demanded along with the diversification in the application of the reactor.

The present disclosure is achieved to address the above-described problem, and the objective is to obtain a reactor that suppresses the transmission of the vibration of the core and the coil and that reduces the vibration thereof.

Means to Solve the Problem

To address the above-described problem, a reactor of the present disclosure includes:

a coil with a cylindrical shape; and a core having legs around which the coil is wound, in which the legs do not contact with all of an inner circumferential surface of the coil, and a gap is provided between all of the legs and the inner circumferential surface of the coil.

Effect of Invention

The reactor that can suppress the transmission of the vibration of the core and the coil and that can reduce the vibration thereof can be obtained.

EMBODIMENTS

First Embodiment

Figure 1:
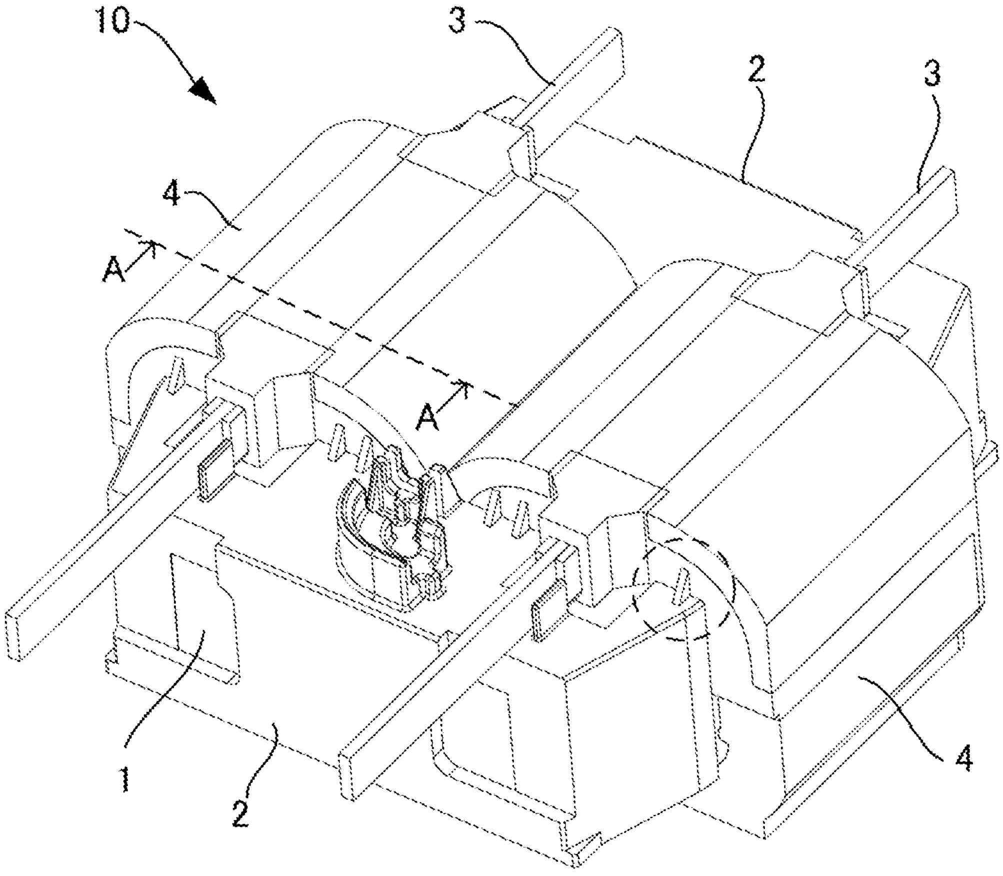
FIG. 1 is a perspective view illustrating an entire configuration of a reactor according to a first embodiment.
Figure 2:
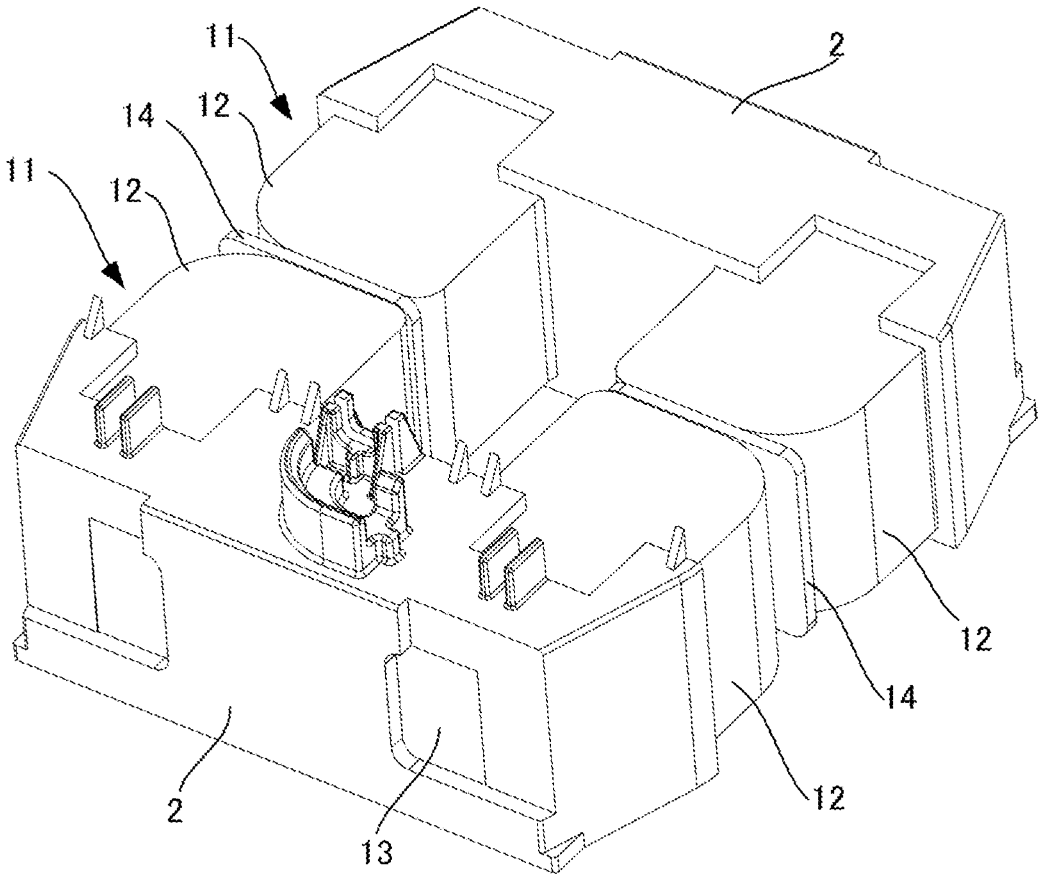
FIG. 2 is an upper perspective view illustrating an entire configuration of a molded core.
Figure 3:
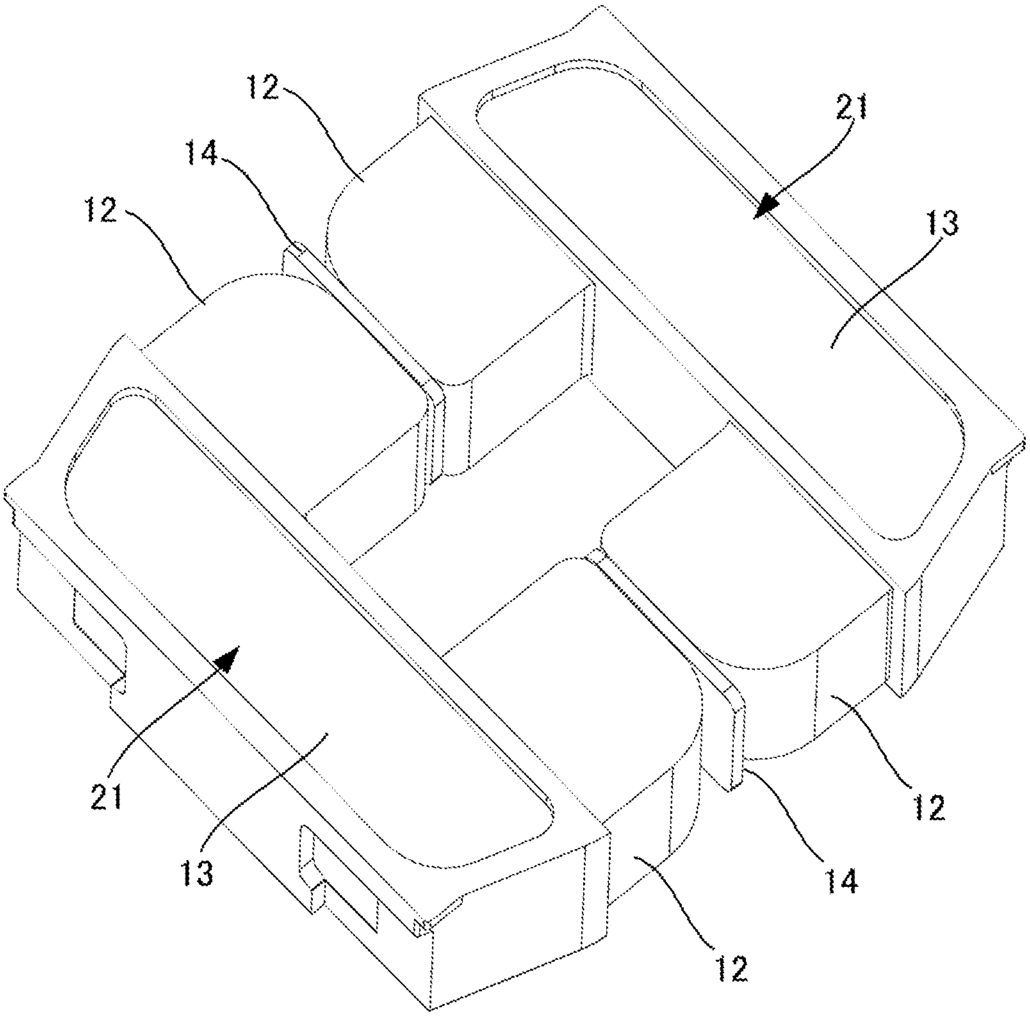
FIG. 3 is a bottom perspective view illustrating an entire configuration of the molded core.
Figure 4:
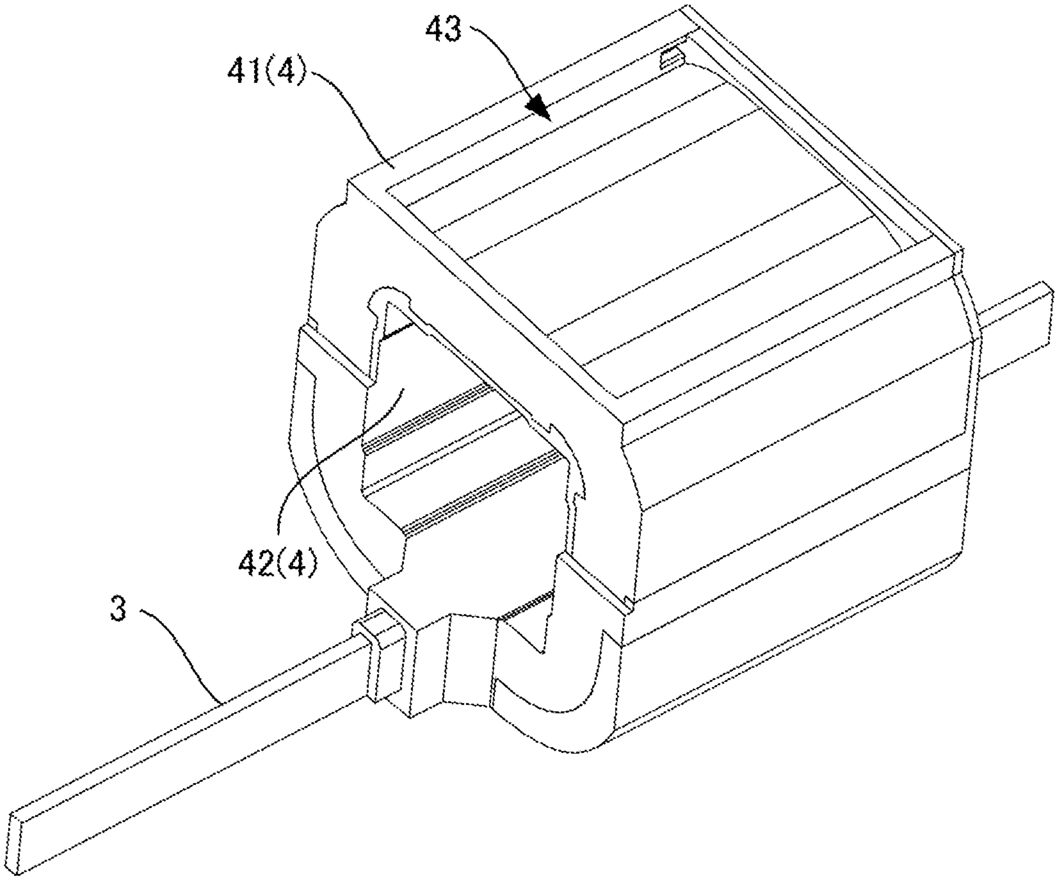
FIG. 4 is a bottom perspective view illustrating a molded coil.

A reactor according to a first embodiment is described with the reference to figures. In the figures, for ease of understanding, dimensions, positional relationship, ratio, and shapes may be emphasized, and the present disclosure is not limited thereto. FIG. 1 is a perspective view illustrating an entire configuration of the reactor. FIG. 2 is an upper perspective view illustrating an entire configuration of a molded core. FIG. 3 is a bottom perspective view illustrating an entire configuration of the molded core. FIG. 4 is a bottom perspective view illustrating a molded coil.

A reactor 10 is an electromagnetic component which converts electric energy to magnetic energy, and accumulates and releases said energy, and is used in various application such as OA equipment, solar power generation system, and vehicles. The reactor 10 of the present embodiment includes a core 1, a core mold resin 2, a coil 3, and a coil mold resin 4.

The core 1 may be a dust core, a ferrite core, a laminated copper plate, or a metal composite core, etc. The metal composite core is a magnetic body formed by kneading magnetic powder and a resin and curing the resin.

The core 1 is formed by a U-shaped core component 11 having a pair of legs 12 and a yoke portion 12 connecting the pair of legs 12. Two U-shaped cores 11 are provided. In the core 1, the legs 12 of the U-shaped cores 11 are joined by adhesives to form an annular shape. The coil 3 is mounted on the legs 12.

Note that, in the present embodiment, the legs of the U-shaped cores 11 are joined via spacers 14. The spacer 14 may be non-magnetic bodies, ceramics, non-metals, resin, carbon fibers, or synthesized materials of two or more, or gap papers. In this way, by joining the U-shaped cores 11 by the spacers 14, a magnetic gap is with predetermined width is provided, preventing the reduction in the inductance of the reactor. Furthermore, an air gap may be provided instead of the spacer 14, or gap may not be provided and the U-shaped cores 11 may be directly joined by adhesives.

The core mold resin 2 a resin component that covers a surface of the core 1. The core mold resin 2 is formed integrally with the core 1 by molding. For example, types of the resin may be epoxy resins, urethane resins, BMC (Bulk Molding Compound), PPS (Polyphenylene Sulfide), PBT (Polybutylene Terephthalate), or compositions thereof. Note that thermo conductive filler may be mixed in the resin.

In the present embodiment, the core mold resin 2 only covers the yoke portion 13 of the core 1. In other words, the legs 12 of the core 1 are not covered by the core mold resin 2 and are exposed. The core mold resin 2 includes a bottom opening 21. The bottom opening 21 is located in a bottom surface of the yoke 13 and the bottom surface of the yoke 13 is exposed. A heat dissipation component such as heat dissipation sheets are provided in the exposed bottom surface of the yoke 13, and the bottom surface of the yoke 13 and the heat dissipation component abuts each other. The bottom surface of the yoke 13 is an end surface of the yoke 13 facing a surface at which the reactor 10 is installed.

The core mold resin 2 includes a core holder (unillustrated) to hold the core 1. For example, the core holders are provided at both ends of the yoke portion 13 in the longitudinal direction and are fastened to the installation target by bolts, etc. In this way, the core 1 is fixed in the desired position.

The coil 3 is formed by one flat rectangular conductive material which is insulation-coated by, for example, enamel. The coil 3 is formed by winding the conductive material in a cylindrical shape while displacing the winding position in the winding direction. In the present embodiment, the coil 3 is a flat wire edgewise coil formed by a copper wire. Note that the wire material, the types, and the winding scheme for the coil is not limited thereto, and other embodiment may be employed.

An end of the coil 3 is electrically connected to external devices. When electric power is supplied from the external devices, current flows through the coil 3, magnetic flux is produced, the magnetic flux flows inside the core 1, and a closed magnetic circuit is formed.

As illustrated in FIG. 4, the coil mold resin 4 is a resin component that covers a surface of the coil 3. The coil mold resin 4 is formed integrally with the coil 3 by molding. Types of the resin may be the same as that of the core mold resin 2.

The coil mold resin 4 covers an outer surface and an inner surface of the coil 3. The coil mold resin 4 includes an outer cover 41 that covers the outer surface of the coil 3 and an inner cover 42 that covers the inner surface of the coil 3. The coil 3 and the legs 12 are insulated by the inner cover 42.

The outer cover 41 does not cover a bottom surface of the coil 3, and the coil 3 is exposed. That is, the outer cover 41 includes a bottom opening 42 that exposes the bottom surface of the coil 3. Elastic heat dissipation material such as heat dissipation sheets, thermal paste, and heat dissipation gap filler (elastic material that is pasty when applied and becomes a sheet-shape when cured) is provided on the bottom surface of the coil 3, and the exposed bottom surface of the coil 3 and the heat dissipation material abut with each other.

The outer cover 41 includes a coil holder (unillustrated) to hold the coil 3. For example, the coil holder is fastened to the installation target by bolts, etc. In this way, the coil 3 is fixed in the desired position. Since the core holder and the coil holder are provided separately and independently, the core 1 and the coil 3 are held and fixed separately and independently.

Figure 5:
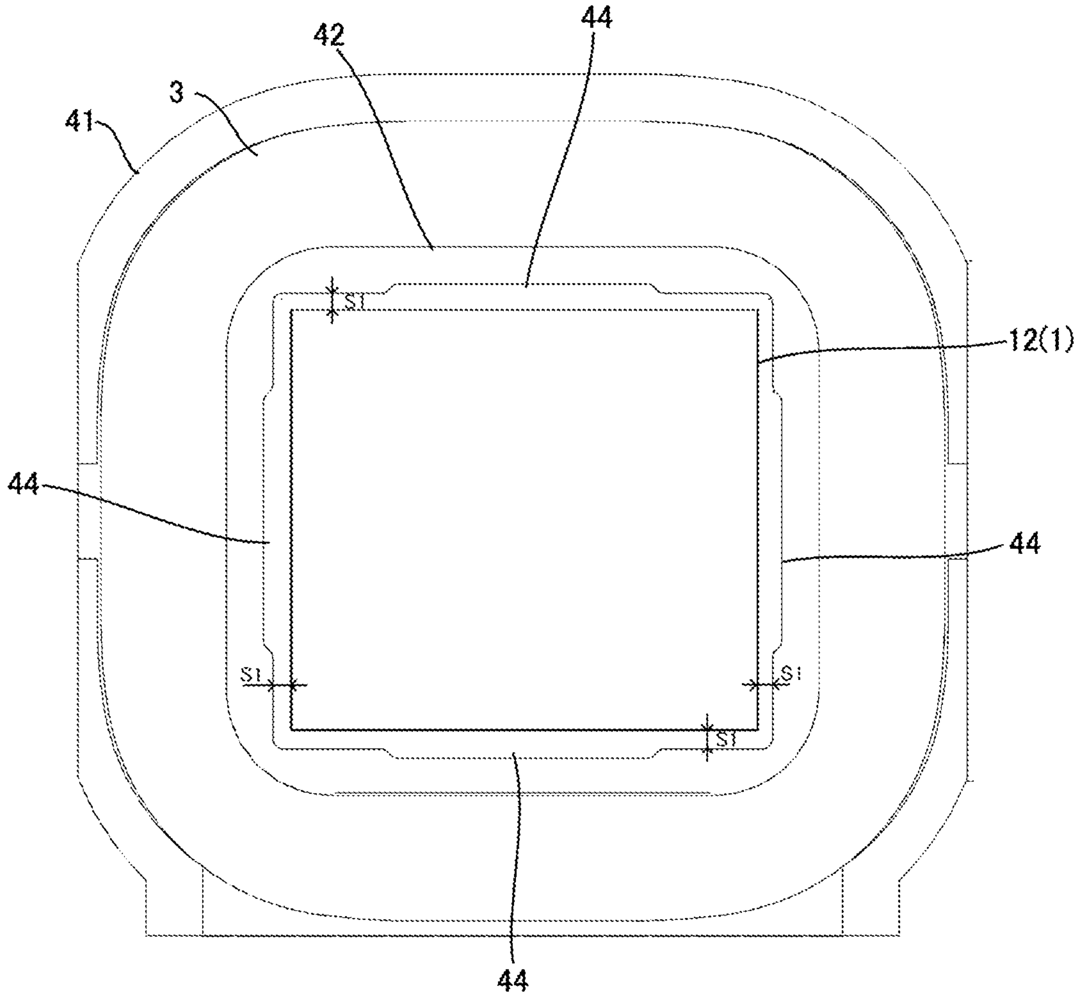
FIG. 5 is an A-A cross-sectional diagram of FIG. 1.

FIG. 5 is an A-A cross-sectional diagram of FIG. 1. As illustrated in FIG. 5, the cross-section of the inner cover 42 is rectangular. The inner cover 42 is held by the coil holder such that the inner cover does contact with the legs 12. That is, a gap S1 is provided between the inner cover 42 and the legs 12. In detail, the gap S1 is provided such that all four surfaces of the legs 12, which has rectangular cross-section, does not contact with the coil mold resin 4. That is, the outer diameter of the legs 12 is smaller than the inner diameter of the coil 3. In the present embodiment, the gaps S1 between the legs 12 and the inner cover 42 for each surface are substantially the same. Notches 44 are provided at central portion of each surface of the inner cover 42.

Figure 6:
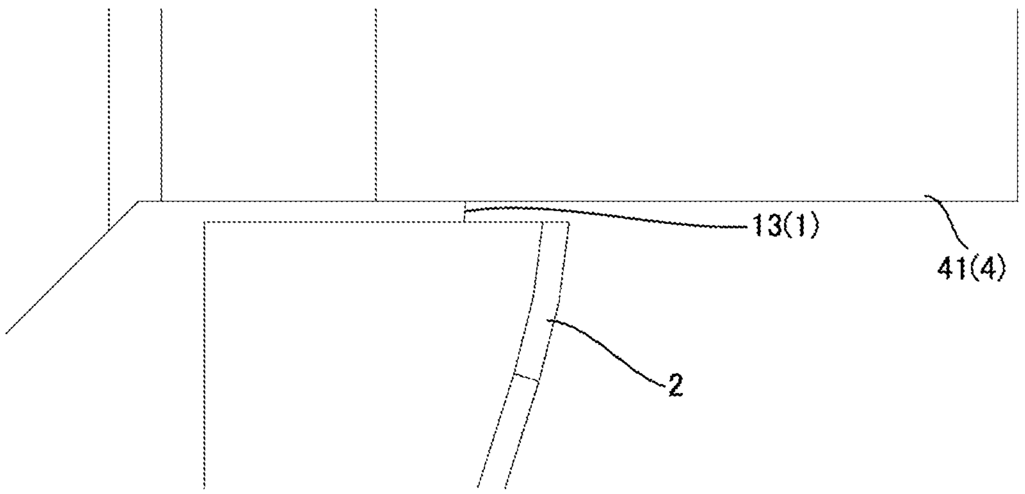
FIG. 6 is an enlarged view of a dotted circled portion in FIG. 1.

FIG. 6 is an enlarged view of a dotted circled portion in FIG. 1. As illustrated in FIG. 6, gap is provided between the core mold resin 2 covering the yoke portion 13 of the core 1 and an end surface of the outer cover 41 orthogonal to the winding direction of the coil 3. That is, the core mold resin 2 is not in contact with the outer cover 41.

As described above, the reactor 10 of the present embodiment includes the coil 3, and the core 1 having the legs 12 around which the coil 3 is wound. The core 1 includes the core mold resin 2 that covers the yoke portion 13 and the core holder that holds the core 1, and the coil 3 has the inner cover 42 that covers the inner surface of the coil 3 and the coil holder that holds the coil 3. Accordingly, the gap S1 is provided all over between the legs 12 and the inner cover 42 such that the legs 12 and the inner cover 42 do not contact with each other.

Conventionally, a core formed by molding the resin is mounted on a coil, and then the core and the coil are integrated by further molding them by resin to reduce the vibration of the reactor. However, when the core and the coil are integrated, the core and the coil are connected via the resin, and the vibration of the coil due to magnetic attraction and the vibration of the core due to magnetostriction are transmitted to each other and resonate, increasing the vibration of the reactor.

However, since the reactor 10 of the present embodiment holds the core 1 and the coil 3 separately, and the gap S1 is provided between the legs 12 of the core 1 and the inner cover 42, the core 1 and the coil 3 are not in contact. Therefore, the transmission of the vibration of the coil due to magnetic attraction and the vibration of the core due to magnetostriction can be suppressed, and the reactor 10 can more suppress the vibration thereof compared with the reactor in which the core and the coil are integrated.

A plurality of the legs 12 is provided. The core 1 further includes the yoke portion 13 that connect the legs 12. The core mold resin 2 covers the yoke portion 13, and the gap is provided between the core mold resin 2 covering the yoke portion 13 and the end surface of the outer cover 41 orthogonal to the winding direction of the coil 3. In this way, transmission of vibration between the yoke portion 13 and the coil 3 can be also suppressed, and the vibration suppression effect of the reactor 10 can be further improved.

The bottom surface of the yoke portion 13 is not covered by the core mold resin 2 and is exposed. Since the core 1 and the coil 3 are not connected, it is difficult to release the heat of the core 1 to the outside via the coil 3. Therefore, by exposing the bottom surface of the yoke portion 13, the heat of the core 1 can be released to the outside from the bottom surface of the yoke portion 13. In particular, according to the present embodiment, by arranging the heat dissipation component to abut the exposed bottom surface of the yoke portion 13, the heat of the core 1 can be released to the outside more effectively. Thus, the heat dissipation performance of the reactor 10 is improved.

The core 1 is formed by the pair of U-shaped core components 11, and the U-shaped core components 11 are adhered by adhesives. In this way, since the vibration itself of the core 1 can be suppressed, so that the vibration of the reactor 10 can be suppressed.

The notch 44 is provided in the inner cover 42. The reactor 10 may be installed in places where there are vibration, such as vehicles. When the reactor 10 is installed in such places, the reactor 10 vibrates due to outside environment, and position of the legs 12 and the coil 3 may be displaced due to this vibration by the outside environment, which may cause the legs 12 to contact with the inner cover 42. Therefore, by providing the notch 44 in the inner cover 42, the area of the legs 12 contacting with the inner cover 42 can be reduced even if the position of the legs 12 and the coil 3 is displaced and the legs 12 contacts with the inner cover 42 due to the vibration by the outside environment. Accordingly, even when the reactor 10 is installed in places where there are vibration. The transmission of vibration between the core 1 and the coil 3 can be minimized, and the vibration of the reactor 1 can be suppressed.

MODIFIED EXAMPLE

Next, a modified example of the reactor 10 is described with the reference to the figures. Note that same reference signs are given to the same configuration and same function as the first embodiment, and the detailed description thereof is omitted. Only different portions are described.

Figure 7:
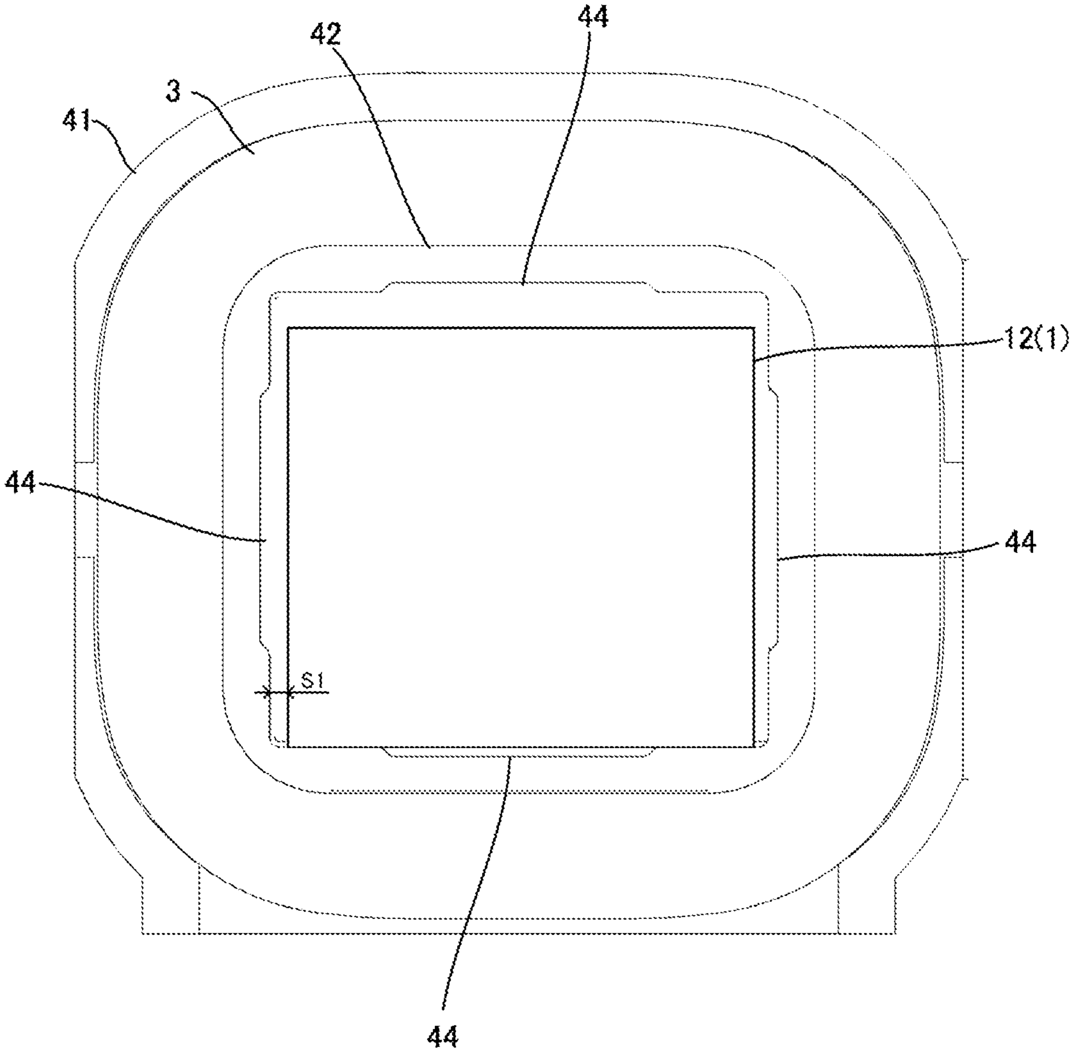
FIG. 7 is a diagram illustrating a positional relationship between legs and an inner covered portion.

In the reactor 10 according to the modified example, the gap S1 is not provided all over between the legs 12 and the inner cover 42. As illustrated in FIG. 7, only a lower surface of the legs 12 is in contact with the inner cover 42. That is, the coil 3 is sandwiched and held by the heat dissipation component and the legs 12. In other word, the gap S1 is provided other than between the lower surface of the legs 12 and the inner cover 42.

Furthermore, the coil 3 is sandwiched and held by the lower surface of the legs 12 of the core 1 fixed by the core holder, and the heat dissipation component, so that the coil 3 does not contact with the installation surface of the reactor 10. In other word, as the embodiment described above, the coil holder to hold the coil 3 by fastening the coil on the installation surface by bolts, etc., is no formed in the outer cover 41. Accordingly, the coil holder includes to hold the coil 3 by sandwiching and holding the coil 3 between the lower surface of the legs 12, and the heat dissipation component.

In this way, if only the lower surface of the legs 12 is in contact with the inner cover 42, the vibration of the reactor 10 can be reduced without affecting the transmission of the vibration. Furthermore, since the coil 3 is in contact with the elastic heat dissipation component, the vibration of the coil 3 can be suppressed by the heat dissipation component. In addition, by making the lower surface of the legs 12 and the inner cover 42 to contact with each other, the heat of the core 1 can be transferred from the lower surface of the legs 12 via the inner cover 42 and the coil 3 to the heat dissipation component provided at the bottom surface of the coil 3. Therefore, the heat does not accumulate in the legs 12, and the vibration suppression effect of the reactor 10 can be obtained while improving the heat dissipation of the reactor 10.

In particular, the coil 3 is sandwiched and held by the heat dissipation component and the lower surface of the legs 12. Therefore, the vibration of the coil 3 itself can be further suppressed. As a result, even if the vibration had been transmitted to the core 1, the vibration of the reactor 10 can be minimized.

Note that the notch 44 may not be provided in the end surface of the inner cover 42 contacting the lower surface of the legs 12. By this, the heat dissipation path from the lower surface of the legs 12 is enlarged, and the heat dissipation of the reactor 10 can be further improved.

Second Embodiment (Schematic Configuration)

Figure 8:
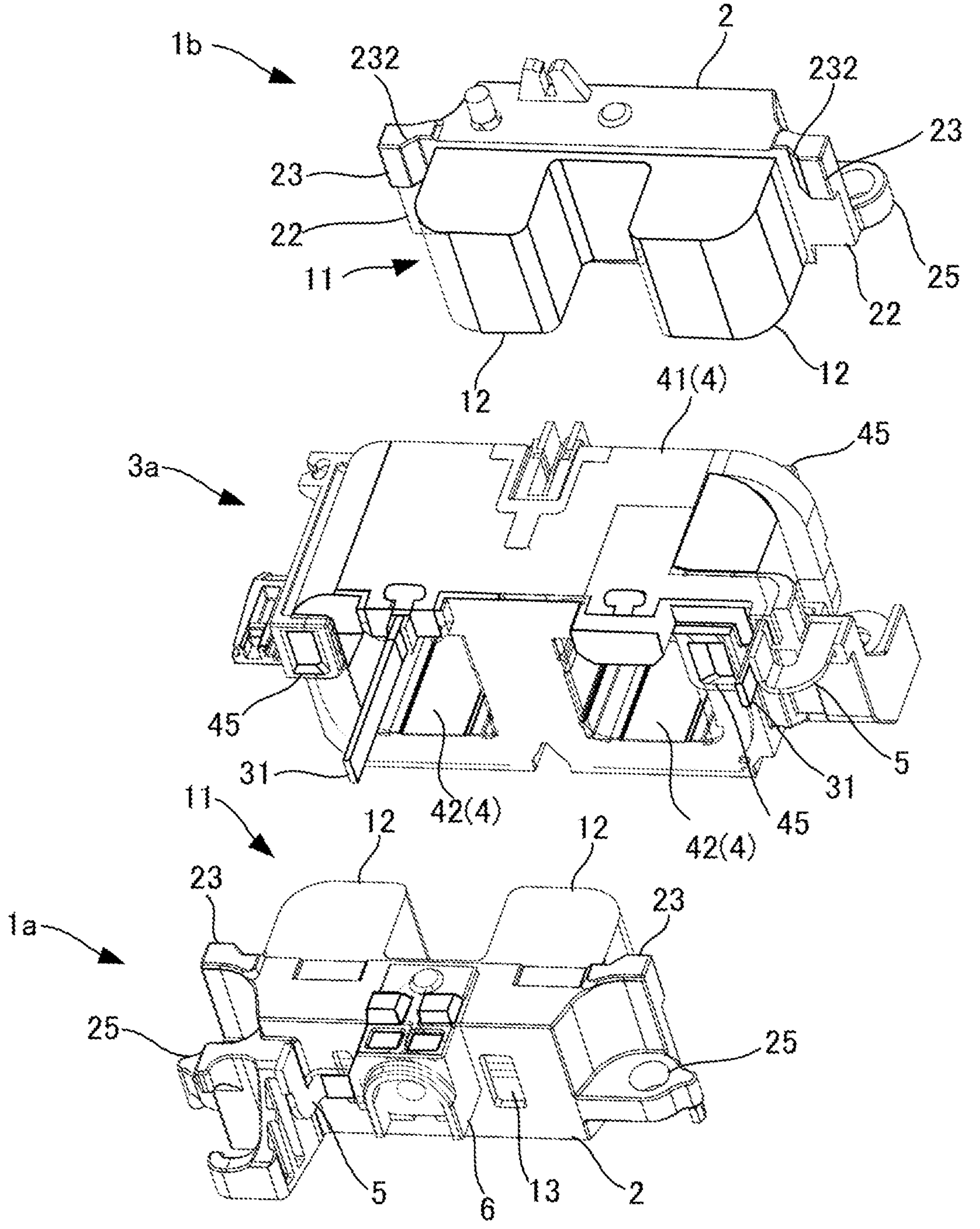
FIG. 8 is a perspective view illustrates a mold core and a mold coil of the reactor before assembly according to a second embodiment.
Figure 9:
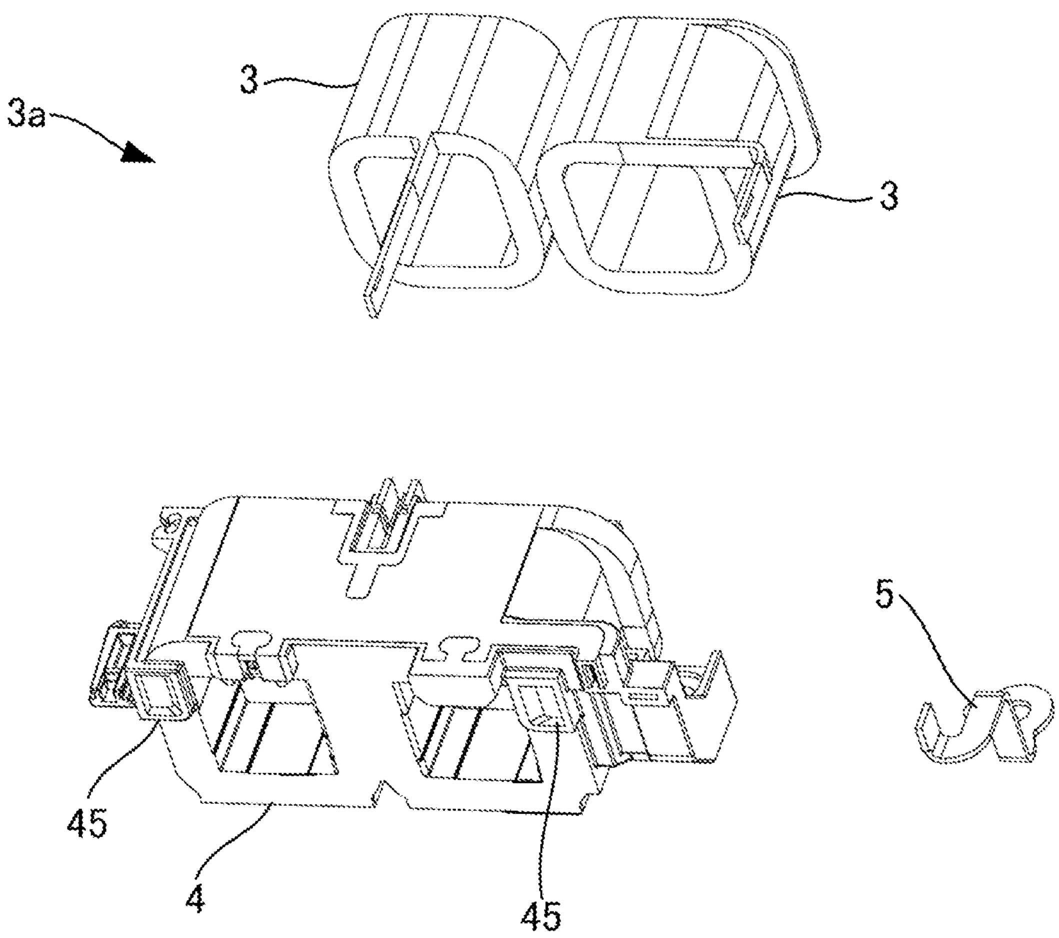
FIG. 9 is an exploded perspective view of the mold coil according to the second embodiment.
Figure 10:
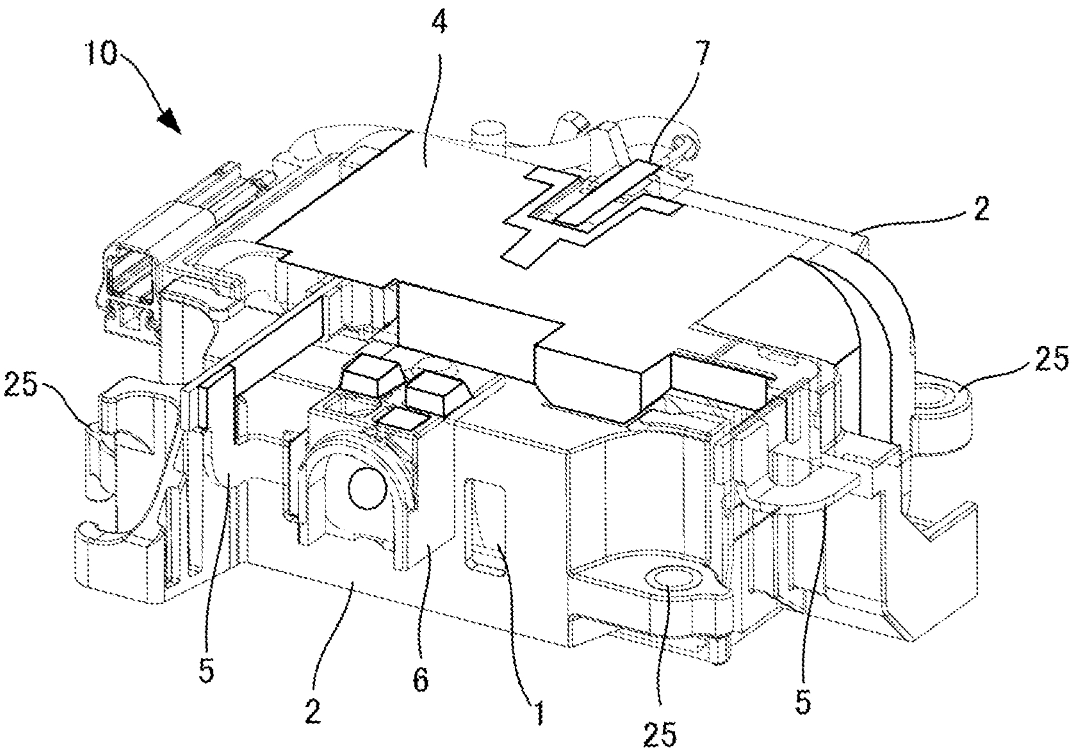
FIG. 10 is a perspective view illustrating the reactor in which the mold core and the mold coil are fit to each other according to the second embodiment.

A reactor according to a second embodiment is described with the reference to the figures. Note that same reference signs are given to the same configuration and same function as the first embodiment, and the detailed description thereof is omitted. Only different portions are described. FIG. 8 is a perspective view illustrating a mold core and a mold coil of the reactor before assembly. FIG. 9 is an exploded perspective view of a mold core and a mold coil. FIG. 10 is a perspective view illustrating the reactor in which the mold core and the mold coil are fit to each other.

Mold cores 1*a* and 1*b* are produced by molding the core 1 with the core mold resin 2. Note that, after the production of the mold core 1*a*, the mold core 1*a* is molded together with a bus bar 5, such that the mold core 1*a* and the bus bar 5 are integrally formed by a bus bar mold resin 6. As illustrated in FIG. 9, the coil mold resin 4 is molded to produce the coil 3. A mold coil 3*a* and the bus bar 5 are integrally formed by the coil mold resin 4.

As illustrated in FIG. 10, the reactor 10 is assembled by fitting the mold cores 1*a* and 1*b* to the mold coil 3*a*. When the mold cores 1*a* and 1*b* are fit to the mold coil 3*a*, the mold cores 1 and 1*b* inserted in an inner circumference of the mold coil 3*a* does not contact with an inner circumferential surface of the mold core 3*a*, and a gap S1 is formed. The assembled reactor 10 is fixed to the installation surface of the installation target by a fixing portion 25 of the mold cores 1*a* and 1*b*. Note that the direction orthogonal to the installation surface is the vertical direction, and the direction getting close to the installation surface is referred to as bottom or lower, and the direction getting away from the installation surface is referred to as upper. The vertical direction in actual installation of the reactor 10 may be different.

Figure 11:
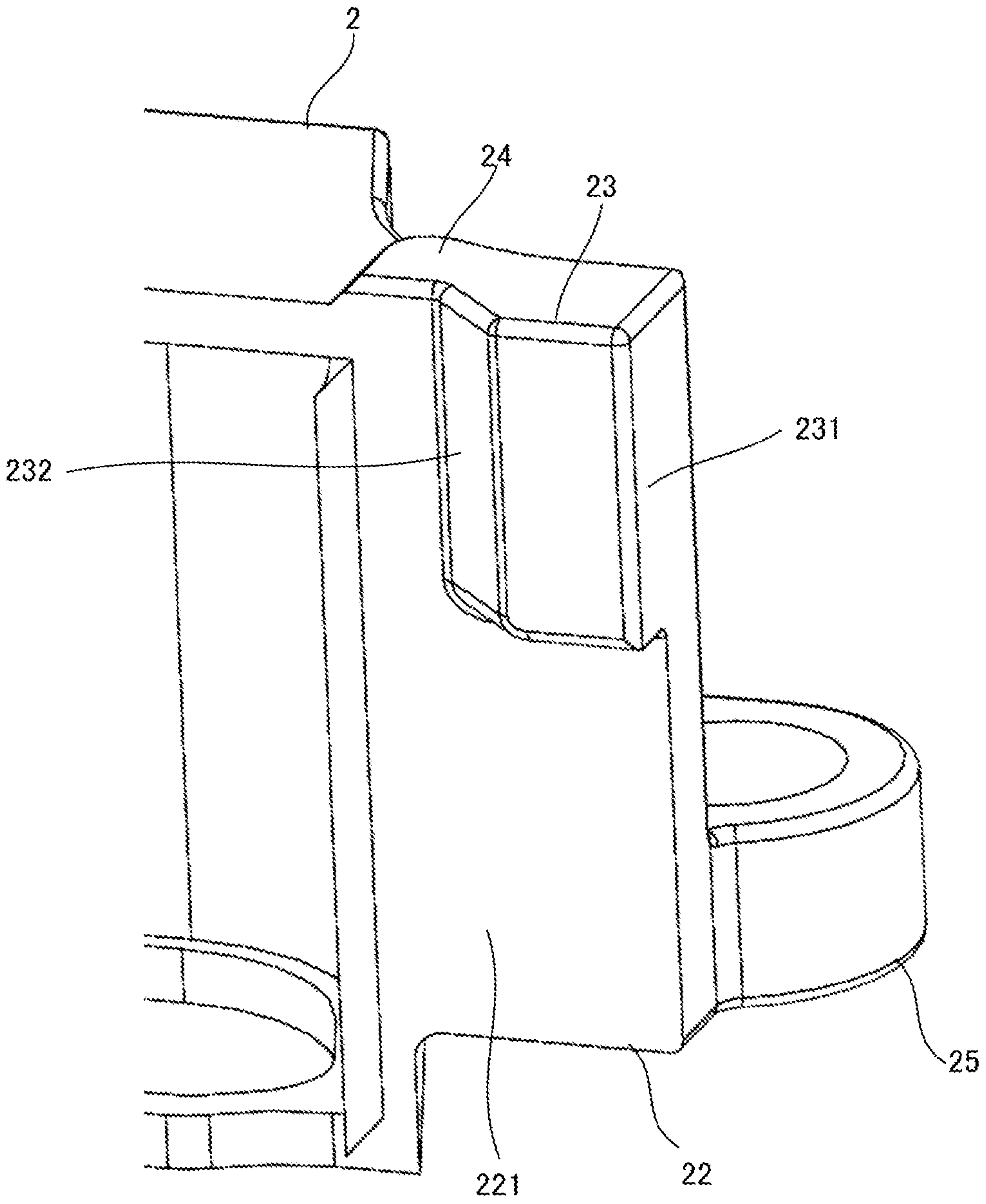
FIG. 11 is an enlarged perspective view of a core mold resin.

As illustrated in FIG. 11, the core mold resin 2 includes an extended portion 22 and a core-side fitting portion 23. The extended portion 22 is a rectangular tabular component. The extended portions 22 extend from both side surfaces of the yoke portion 13 of the core 1 in parallel with the winding axis. That is, two extended portion 22 are provided to each of the mold core 1*a* and 1*b*. The extended portion 22 extend from the side surfaces of the yoke portion 13 and in parallel with the aligning direction of the legs 12, so that wide surface thereof becomes orthogonal to the winding axis. The extended portion 22 includes a facing surface 221 that faces the mold coil 3*a*. That is, the facing surface 221 is a side surface at the side facing the mold coil 3*a* among the wide surface of the extended portion 22.

The extended portion 22 extends from the yoke portion 13 and expands more than the core mold resin 2 covering the upper surface of the yoke portion 13. The extended portion 22 includes a thick portion 24 that is thicker than the core mold resin 2 covering the upper surface of the yoke portion 13. The thick portion 24 is a portion in the extended portion 22 that is above the core mold resin 2 covering the upper surface of the yoke portion 13.

The core-side fitting portion 23 is provided a facing surface 221 of the extended portion 22 facing the mold coil 3*a*. The core-side fitting portion 23 is provided in an upper corner that is distant from the yoke portion of the facing surface 221. The core-side fitting portion 23 is a convex portion that protrudes from the facing surface 221 toward the mold coil 3*a*. By fitting the core-side fitting portion 23 to a coil-side fitting portion 45 described later, the mold coil 3*a* is held by the mold cores 1*a* and 1*b*. The protrusion length and the length in the vertical direction of the core-side fitting portion 23 are sufficient as long as the lengths can hold the mold coil 3*a*. By increasing the protrusion length and the length in the vertical direction of the core-side fitting portion 23, the strength of the core-side fitting portion 23 is improved and can hold the mold coil 3*a* more stably.

An upper surface of the core-side fitting portion 23 is in the same plane as the upper surface of the extended portion 22. The core-side fitting portion 23 includes a vertical surface 231 and an inclined surface 232. The vertical surface 231 extends downward from the upper surface of the core-side fitting portion 23 and is on the same plane as the side surface of the extended portion 22. The inclined portion 232 is a surface at the side opposite to the vertical surface 231. The inclined surface 232 expands from a protruding tip of the core-side fitting portion 23 toward the facing surface 221. That is, the width of the core-side fitting portion 23 (the length of the legs 12 in the aligning direction) is longer in the facing surface 221-side and becomes shorter as it goes toward the protruding tip, which forms a tapered shape. In the present embodiment, the inclination angle of the include surface 232 is 45 degrees.

Note that the core mold resin 2 includes the fixing portion 25 to fix the reactor 10 to the installation target. The fixing portion 25 is a lower end of the extended portion 22 and is provided at a side opposite the facing surface 221. By fastening the fixing portion 25 and the installation target by bolts, etc., the reactor 10 is fixed to the installation surface.

As illustrated in FIG. 9, the coil mold resin 4 includes the coil-side fitting portion 45 that fits with the core-side fitting portion 23. A same number of the coil-side fitting portion 45 as the number of the core-side fitting portion 23 is provided at corresponding positions. That is, four coil-side fitting portions 45 are provided. The coil-side fitting portions 45 are each provided at upper corners of the end surface of the coil mold resin 4 facing the facing surface 221. That is, when seeing the mold coil 3*a* from above, the coil-side fitting portion 45 are provided at four corners of the mold coil 3*a*.

Figure 12:
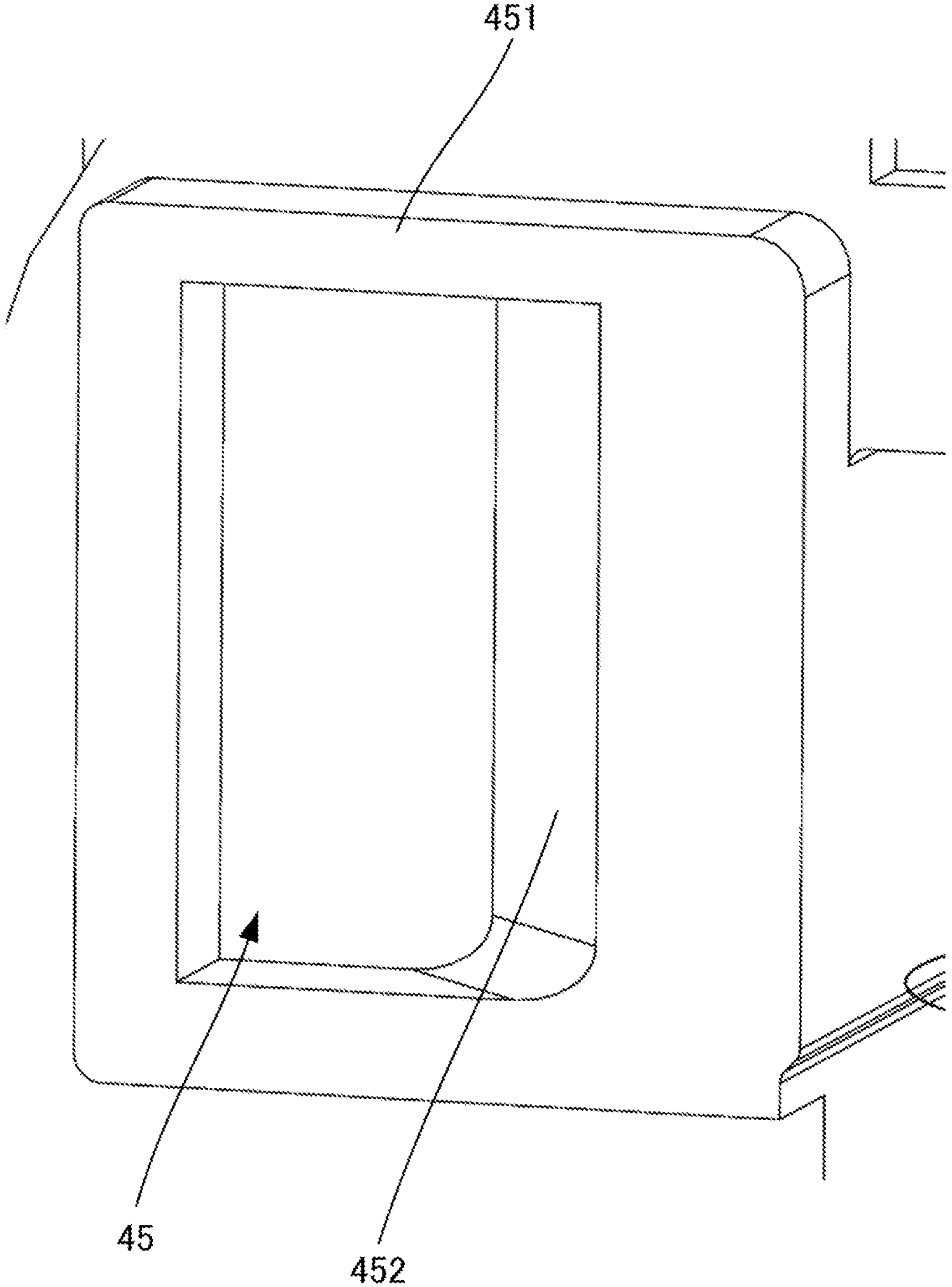
FIG. 12 is an enlarged perspective view of a coil-side fitting portion.

FIG. 12 is an enlarged perspective view of a coil-side fitting portion 45. The coil-side fitting portion 45 a concaved portion that is dent toward the coil 3-side from a flat surface 451 facing the facing surface 211. The concaved portion has the same shape as the protruding shape of the core-side fitting portion 23. That is, the coil-side fitting portion 45 includes an inclined surface 452 a position corresponding to the inclined surface 232 of the core-side fitting portion 23.

Figure 13:
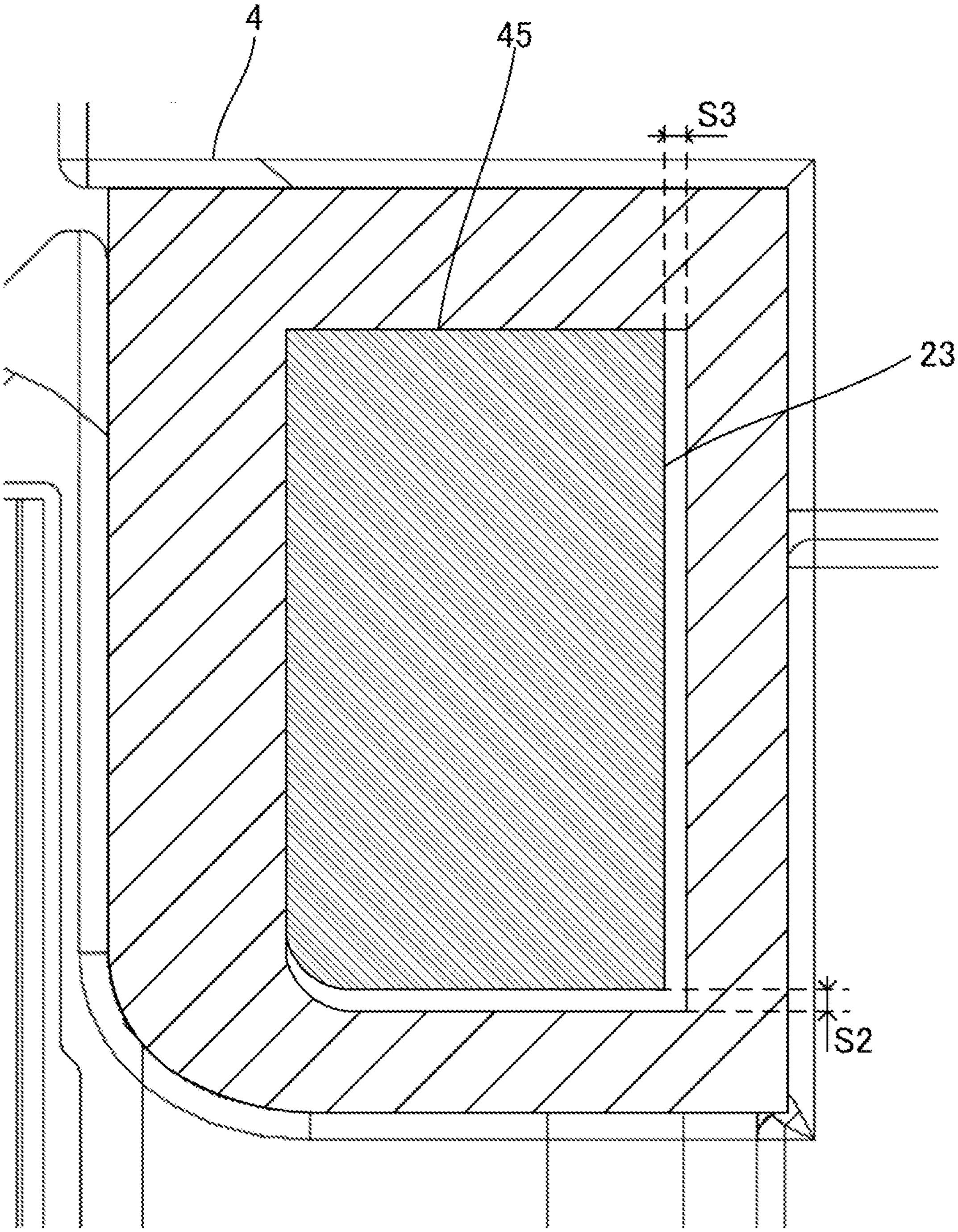
FIG. 13 is a schematic diagram illustrating a core-side fitting portion and a coil-side fitting portion fit with each other.

FIG. 13 is a schematic diagram illustrating a core-side fitting portion and a coil-side fitting portion fit with each other. The size of the coil-side fitting portion 45 is the same or slightly larger than the size of the core-side fitting portion 23. In the present embodiment, as illustrated in FIG. 13, the inner diameter of the coil-side fitting portion 45 is slightly larger than the outer diameter of the core-side fitting portion 23. Since the mold coil 3*a* is held by the mold cores 1*a* and 1*b*, the upper surface of the core-side fitting portion 23 and the inner upper surface of the coil-side fitting portion 45 abut with each other. At this time, the lower surface of the core-side fitting portion 23 and the coil-side fitting portion 45 do not abut with each other, such that a clearance S2 is created. Furthermore, when one side surface of the core-side fitting portion 23 and the coil-side fitting portion 45 abut with each other, the other side surface of the core-side fitting portion 23 and the coil-side fitting portion 45 do not abut with each other, such that a clearance S3 is created. In the present embodiment, the distance of clearances S2 and S3 are the same.

That is, the clearances S2 and S3 are the distance between the coil-side fitting portion 45 facing the end surface of the core-side fitting portion 23, and the end surface opposite to said end surface, when the coil-side fitting portion 45 and said end surface of the core-side fitting portion 23 are in contact with each other. For example, when the coil-side fitting portion 45 and the upper end surface of the core-side fitting portion 23 are in contact with each other, the clearances are the distance between the lower end surface of the core-side fitting portion 23 and the coil-side fitting portion 45 facing said lower end surface, and when the coil-side fitting portion 45 and the left end surface of the core-side fitting portion 23 are in contact with each other, the clearances are the distance between the right end surface of the core-side fitting portion 23 and the coil-side fitting portion 45 facing said right end surface.

The clearances S2 and S3 between the coil-side fitting portion 45 and the core-side fitting portion 23 are smaller than the gap S1 between the legs 12 and the inner cover 42. Although it is not limited thereto, in the present embodiment, the gap S1 is 0.3 mm and the clearances S2 and S3 are 0.1 mm. The reason why the clearances S2 and S3 are 0.1 mm is, because the core-side fitting portion 23 of the protruding portion would be larger than the predetermined size when there are no clearances S2 and S3, or because the fitting portions could not be fit when the coil-side fitting portion 43 that is the concaved portion is formed smaller than the predetermined size, causing the assemblability to get worse. Therefore, when taking the productivity in consideration, it is preferable to provided the clearances S2 and S3 as much as 0.1 mm. Furthermore, when there are the clearances S2 and S3 as much as 0.1 mm, the displacement of the mold cores 1*a* and 1*b* and the mold coil 3*a* can be minimized even if the reactor 10 vibrates. Therefore, even if the reactor 10 vibrates, the legs 12 and the inner cover 42 can be prevented from contacting with each other.

Furthermore, when the size of the clearance S2 and the size of the clearance S3 are different, longer clearance would be compared with the gap S1. For example, when the clearance S2 is 0.1 mm and the clearance S3 is 0.2 mm, the clearance S3 would be the reference to be compared with the gap S1 if it is smaller or not. Note that, although each of the mold cores 1*a* and 1*b* includes two core-side fitting portion 23, it would be enough at if the clearance S2 between the coil-side fitting portion 45 and at least one of the core-side fitting portion 23 is smaller than the gap S1.

The mold coil 3*a* does not include the fixing portion and is held by fitting the coil-side fitting portion 45 and the core-side fitting portion 23. Note that the heat dissipation material is provided on the bottom surface of the mold core 3*a*, and the mold core 3*a* is placed on the heat dissipation material.

As illustrated in FIGS. 8 and 10, the reactor 10 includes the bus bar 5. For example, the bus bar 5 is a tabular conductive material such as copper and aluminum. One end of the bus bar 5 is connected to the end of the conductor material 31 forming the coil 3 by welding, and the other end of the bus bar 5 is connected to a terminal for the connection with external devices. Two bus bars 5 are provided. One of the bus bars 5 is fixed by the coil mold resin 4, and the other of the bus bars 5 is fixed by a bus bar mold resin 6.

The bus bar mold resin 6 is a resin material component which covers the bus bar 5 by molding and fixes the bus bar 5. The bus bar mold resin 6 is formed on the core mold resin 2 of the mold core 1*a*. The type of the resin of the bus bar mold resin 6 may be the same as that of the core mold resin 2.

As illustrated in FIG. 10, the reactor 10 further includes a sensor 7. The sensor 7 may be magnetic sensors and temperature sensors. In the present embodiment, the sensor 7 is a temperature sensor and detects the temperature of the reactor 10. The sensor 7 is provided between the coil 3 and is held by a sensor holder of the coil mold resin 4.

(Action and Effect)

As described above, the reactor 10 of the present embodiment includes the mold coil 3*a* including the cylindrical coil 3 and the coil mold resin 4 which covers at least a part of the cylindrical coil 3, and the mold cores 1*a* and 1*b* including the core 1 including the legs 12 around which the coil 3 is wound and the core mold resin 2 which covers at least a part of the core 1. The coil mold resin 4 includes the coil-side fitting portion 45 to which the mold cores 1*a* and 1*b* are fit, and the core mold resin 2 includes the core-side fitting portion 23 which fit with the coil-side fitting portion 45 at the position corresponding to the coil-side fitting portion 45. The legs 12 do not contact with all of the inner circumferential surface of the coil 3, and the gap S1 is provided between the legs 12 and the inner circumferential surface of the coil 3.

The reactor 10 of the present embodiment holds the mold coil 3*a* by fitting the core-side fitting portion 23 and the coil-side fitting portion 45, and the gap S1 is provided between the legs 12 and the inner cover 42 so that the core 1 and the coil 3 do not contact with each other. Accordingly, the transmission of the vibration of the coil due to magnetic attraction and the vibration of the core due to magnetostriction can be suppressed as the conventional reactor, and the vibration of the reactor 10 can be suppressed compared with the reactor in which the coil 3 and the core 1 are integrated.

In particular, the clearances S2 and S3 between the core-side fitting portion 23 and the coil-side fitting portion 45 are smaller than the gap S1. When the reactor 10 is installed in vehicles, etc., the reactor 10 itself would vibrates, and the position of the legs 12 and the coil 3 may be displaced, which may cause the legs 12 to contact with the inner cover 42. However, by making the clearances S2 and S3 between the core-side fitting portion 23 and the coil-side fitting portion 45 smaller than the gap S1, the core-side fitting portion 23 and the coil-side fitting portion 45 contact with each other first before the legs 12 and the inner cover 42 contacts with each other, so that the legs 12 and the inner cover 42 are prevented from contacting with each other.

The core mold resin 2 includes the extended portion 22 extending from the side surface of the yoke portion 13 in parallel with the winding axis, and the extended portion 22 expands and extends to be thicker than the core mold resin 2 covering the upper surface of the yoke portion 3. By this, the strength of the core-side fitting portion 23 is improved. Since the core-side fitting portion 23 is fit with the coil-side fitting portion 45 to hold the mold coil 3*a*, force is loaded thereto. Accordingly, the transformation and damaging of the core-side fitting portion 23 can be prevented by providing the thick portion 24. Furthermore, since the transformation and damaging of the core-side fitting portion 23 can be prevented, the sizes of the clearances S2 and S3 can be maintained, and the core 1 and the coil 3 can be prevented from contacting with each other.

Four coil-side fitting portions 45 are provided, and the coil-side fitting portions 45 are each provided at upper corners of the end surface of the mold coil 3*a* facing the facing surface 221. Four core-side fitting portions 23 are provided, and the core-side fitting portions 23 are respectively provide at the position corresponding to the coil-side fitting portions 45.

In this way, when seeing in the plan view, the coil-side fitting portion 45 are provided at the corners of the mold coil 3*a*. By this, the core-side fitting portion 23 can stably hold the mold coil 3*a* by the four fitting portions.

The core-side fitting portion 23 is a convex portion that protrudes toward the coil-side fitting portion 45, and the coil-side fitting portion 45 is a concaved portion that is dent in the same shape as the convex portion. When assembling the mold cores 1*a* and 1*b* and the mold coil 3*a*, since the worker normally holds the mold cores 1*a* and 1*b* in hands and fits the core-side fitting portion 23 into the coil-side fitting portion 45, it is easier to assemble when the core-side fitting portion has the convex shape rather than when the core-side fitting portion 23 has the concaved shape and the coil-side fitting portion 45 has the convex shape. Therefore, the assembling efficiency is improved.

At least one end surface of the core-side fitting portion 23 protruding toward the coil-side fitting portion 45 includes the inclined surface 232. The inclined surface 232 acts as a guide at the time of assembling the mold cores 1*a* and 1*b* and the mold coil 3*a*. Therefore, the assembling efficiency is further improved.

It is preferable to provide the inclined surface 232 on a surface orthogonal to the direction the stress due to the vibration relative to the reactor 10 is stronger. By this configuration, the stress due to the vibration can be dispersed.

Other Embodiment

In the description herein, although embodiments according to the present disclosure are described, said embodiments are only provided as examples and are not intended to limit the scope of claims. The above-described embodiments may be implemented by other various forms, and various omissions, replacements, and changes may be made without departing from the scope of claims. The embodiments and modifications thereof are included in the invention described in the claims and equivalent ranges thereto, as well as in the scope and abstract of the invention.

In the first embodiment, the coil holder fixes and positions the coil by fastening the coil by bolts, etc., however, the coil holder may be implemented in any forms as long as it holds the coil 3. For example, the coil holder may be fit to the heat dissipation material provided in the bottom surface of the coil 3 to fix the coil 3. That is, the coil 3 may contact with the heat dissipation material and does not contact with the installation surface of the reactor 10. In this case, since the heat dissipation material and the exposed bottom surface of the coil 3 contacts with each other, the heat of the coil 3 can be released to the heat dissipation material, and the heat dissipation performance of the reactor 10 is improved. Furthermore, since the coil 3 does not contact with the installation surface, the transmission of the vibration of the coil 3 and the core 1 can be prevented via the coil holder and the installation surface, and further vibration suppression effect can be achieved.

Furthermore, the core mold resin 2 may not include the core holder, and the coil mold resin 4 may not include the coil holder. The core 1 and the coil 3 may be fixed in any methods as long as the gap is formed between the legs 12 and the inner circumferential surface of the coil 3. For example, a fixing mechanism may be provided to the installation target of the reactor 10, and the core 1 and the coil 3 may be each fit and fixed thereto.

In the embodiments, the legs 12 of the core 1 are not covered by the core mold resin 2 and are exposed, however, the legs 12 may be covered by the core mold resin like the yoke portion 13. In this case, a distance between the core mold resin 2 covering the legs 12 and the inner cover may be the gaps S1. Since it is easier to perform the molding so as to cover the yoke portion 13 and the legs 12 by the core mold resin 2, the productivity is improved.

Furthermore, if the legs 12 are covered by the core mold resin 2, the inner surface of the coil 3 may not be covered by the inner cover 42 and may be exposed. Even in this case, the legs 12 (core 1) and the coil 3 may be insulated by the core mold resin 2. Note that, in this case, a distance between the core mold resin 2 covering the legs 12 and the inner surface of the coils 3 is the gap S1.

In the second embodiment, the clearances S2 and S3 are created between the core-side fitting portion 23 and the coil-side fitting portion 45, however, there may be no clearance. For example, the protruding shape of the core-side fitting portion 23 and the dent shape of the coil-side fitting portion 45 may be same size, and the core-side fitting portion 23 may be press-fit and fit to the coil-side fitting portion 45. Since the mold coil 3*a* is strongly held by the mold cores 1*a* and 1*b*, the legs 12 and the inner cover 42 can be suppressed from contacting with each other even when the reactor 10 vibrates. That is, by making the clearances S2 and S3 zero, the displacement of the mold cores 1*a* and 1*b* and the mold coil 3*a* due to the vibration can be effectively suppressed. Note that, in this case, it is preferable that at least one of the resin forming the core-side fitting portion 23 and the coil-side fitting portion 45 is elastic material.

Furthermore, in the second embodiment, although the core-side fitting portion 23 has the protruding convex shape and the coil-side fitting portion 45 has the dent concaved shape, it may be opposite. That is, the core-side fitting portion 23 may have the dent concaved shape, and the coil-side fitting portion 45 may have the protruding convex shape.

In the second embodiment, although four core-side fitting portions 23 and four coil-side fitting portions 45 are provided, it is not limited thereto. One core-side fitting portion 23 may be provided to each of the mold cores 1*a* and 1*b*. Furthermore, the mold cores 1*a* and 1*b* may not have the same number of core-side fitting portions 23, and the mold core 1*a* may have one core-side fitting portions 23 and the mold core 1*b* may have two core-side fitting portions 23.

In the second embodiment, the core-side fitting portions 23 is provided at the upper corner of the facing surface 221, however, the core-side fitting portions 23 may be provided at the lower corner of the facing surface 221. Furthermore, the position where the core-side fitting portions 23 is provided is not limited, and the core-side fitting portions 23 may be provided not at the corner, but at the middle part in the length of the facing surface 221. Though, it is preferable to provide the core-side fitting portions 23 at the upper corner of the facing surface 221, because so that the mold cores 1*a* and 1*b* can stably hold the mold coil 3*a*.

One inclined surface 232 is provided only on the end surface at the legs 12-side among the end surfaces of the core-side fitting portions 23 orthogonal to the aligning direction of the legs 12, however, the inclined surface may be provided on other end surfaces. Though it is not preferable to provide the inclined surface 232 on the upper surface of the core-side fitting portions 23. It is preferable to make the upper surface of the core-side fitting portions 23 a flat surface to hold the mold coil 3*a*.

REFERENCE SIGN

10: reactor
1: core
11: U-shaped core component
12: leg
13: yoke portion
14: spacer
2: core mold resin
21: bottom opening
22: extended portion
221: facing surface
23: core-side fitting portion
231: vertical surface
232: inclined surface
24: thick portion
25: fixing portion
3: coil
4: coil mold resin
41: outer cover
42: inner cover
43: bottom opening
44: notch
45: coil-side fitting portion
451: flat surface
452: inclined surface
5: bus bar
6: bus bar mold resin
7: sensor
1*a*, 1*b*: mold core
3*a*: mold coil

What is claimed is:

1. A reactor comprising:

a mold coil including a coil with a cylindrical shape, and a coil mold resin which covers at least a part of the coil; and a mold core including a core having legs around which the coil is wound, and a core mold resin which covers at least a part of the core, wherein:

the coil mold resin includes a coil-side fitting portion to which the mold core is fit, the core mold resin includes a core-side fitting portion which fit with the coil-side fitting portion at a position corresponding to core-side fitting portion, the mold core does not contact with all of an inner circumferential surface of the mold coil, and when a clearance is created between the core-side fitting portion and the coil-side fitting portion, the clearance is smaller than a gap that is provided between the mold core and the inner circumferential surface of the mold coil.

2. The reactor according to claim 1, wherein the core-side fitting portion and the coil-side fitting portion are fit to each other without the clearance.

3. The reactor according to claim 1, wherein:

the core includes a plurality of legs and a yoke portion which connects the plurality of the legs, and the core mold resin includes an extended portion which extends from a side surface of the yoke portion in parallel with a winding direction of the coil.

4. The reactor according to claim 1, wherein:

a pair of the mold core is provided, the mold core is arranged between the pair of the mold core, four coil-side fitting portions are provided, each of the coil-side fitting portions is provided at upper corners of an end surface of the mold coil facing the mold core, respectively, four core-side fitting portions are provided, and each of the core-side fitting portions is provided at positions corresponding to the coil-side fitting portions, respectively.

5. The reactor according to claim 1, wherein:

the core-side fitting portion is a convex portion which protrudes toward the coil-side fitting portion, and the coil-side fitting portion is a concaved portion which is dent in a same shape as the convex portion.

6. The reactor according to claim 5, wherein at least one end of the core-side fitting portion protruding toward the coil-side fitting portion is an inclined surface.

* * * * *